United States Patent [19]

Leclerc

[11] 4,116,113
[45] Sep. 26, 1978

[54] SPRING ACTUATED BRAKE CYLINDER DEVICE WITH FLUID PRESSURE OPERABLE RELEASE PISTON LOCKOUT MEANS

[75] Inventor: Serge Leclerc, Sevran, France

[73] Assignee: Wabco Westinghouse, Freinville-Sevran, France

[21] Appl. No.: 814,078

[22] Filed: Jul. 11, 1977

[51] Int. Cl.² ............................................. F15B 15/26
[52] U.S. Cl. ........................................... 92/24; 91/42; 91/44; 92/27; 188/170; 188/265; 303/6 M; 303/89
[58] Field of Search .................... 188/170, 265; 92/24, 92/27, 28, 130 A; 91/41, 44, 42; 192/91 R, 114 R; 303/6 M, 89

[56] References Cited

U.S. PATENT DOCUMENTS

| 1,085,964 | 2/1914 | Briggs .................................... 91/44 |
| 3,176,590 | 4/1965 | Uhtenwoldt et al. ............... 91/44 X |
| 3,508,794 | 4/1970 | Engle .................................. 91/44 X |
| 3,597,016 | 5/1969 | Gachot et al. ......................... 303/89 |
| 4,014,579 | 3/1977 | DuBois ............................. 303/89 X |

*Primary Examiner*—George E. A. Halvosa
*Attorney, Agent, or Firm*—R. S. Visk; R. W. McIntire, Jr.

[57] ABSTRACT

A brake cylinder device including a brake piston operable by a spring force to an application position and to a release position in response to an opposing fluid pressure force, and a fluid pressure operable locking device operable responsively to release pressure for locking the piston in the release position and for delaying such locking of the piston in the release position during normal operations to prevent untimely locking-up of the piston.

5 Claims, 5 Drawing Figures

SPRING ACTUATED BRAKE CYLINDER DEVICE WITH FLUID PRESSURE OPERABLE RELEASE PISTON LOCKOUT MEANS

BACKGROUND OF THE INVENTION

The invention is particularly concerned with a spring-actuated brake cylinder device of the type comprising a brake piston which is acted on one side thereof by a spring member for exerting a brake-applying force in one axial direction, and on the opposite side thereof, by service brake pressure prevailing in a release pressure control chamber for effecting a partial or total neutralization of the spring force, and wherein the improvement comprises a locking device including a locking element for axially locking the brake piston in a brake release position, when reduction of said service brake pressure occurs at a rate in excess of a certain rate, for actuating said locking element, said locking piston being subjected to the service brake pressure acting thereon in a direction in which the locking device is operated to an unlocked position against means exerting a lock-applying force thereon.

Although the brake cylinder device embodying the invention is essentially intended to be used with pneumatic brake systems for railway vehicles, it can also be used with pneumatic brake systems for highway vehicles and with hydraulic brake systems for any type of vehicle.

Certain brake cylinder devices are already known which comprise a spring-actuated piston capable of acting on a rod connected to a friction brake when the pressure decreases sufficiently in a release chamber. Some of these brake cylinder devices have the more specific function of taking over the task of the service brake when the service pressure prevailing in the release chamber becomes insufficient after service brake activation, said brake cylinder devices being intended to partially or entirely take over the function of the service brake cylinder whose action diminishes. In this case, the spring-actuated cylinder piston must be provided with a locking device which enables it to remain inactive or in a release position when the service pressure is cancelled.

A problem which is difficult to solve is that of providing proper cooperative action between the operation of the locking device and that of the brake piston of the spring-actuated cylinder device. Indeed, the piston can be axially displaced only if the locking device is either in its unlocked position or in a position in which the locking element is in contact with a part of the brake piston rod having no obstructions such as a shoulder, for example.

SUMMARY OF THE INVENTION

This problem is solved, according to the invention, in that the value of the service brake pressure called the "displacement" value, that is, the degree at which the brake piston begins to move from an extreme brake release position, exceeds the value called the "locking" value, which is a lesser or reduced value of the service pressure or the degree at which the locking piston begins to move from the unlocked position to the locked position.

In this manner, it is ensured that, in the event of superseding braking action following service brake activation, the locking device remains unlocked, as long as the brake piston has not started to move, in order to bring about brake activation by the brake piston.

It is advantageous to provide a delay means at the outlet of the release pressure control chamber of the brake cylinder in order to delay the actuation of the brake piston in relation to the actuation of the locking piston, when the service pressure drops at a relatively rapid rate during normal release following service brake activation or when normally releasing suddenly.

Thus, with the presence of the delay means, it is ensured that, in the event of a normal release following full service brake activation, the locking piston causes the locking element to be moved to a locked position before the spring-actuated brake piston begins to move in the direction of brake application. It should be noted that a normal release corresponds to a relatively rapid drop in service pressure in relation to that which would result from a leaking of compressed fluid from the service brake cylinders.

Preferably, the locking piston is formed by a differential piston whose larger effective area is acted on by service brake pressure in the direction of unlocking and whose smaller effective area is acted upon by said service brake pressure and spring means in the direction of locking, the two pressure areas being disposed, respectively, adjacent an unlocking chamber fed by service brake pressure and a locking chamber also fed by service brake pressure through a delay means causing a delay in the rate of charging of the locking chamber relative to the unlocking chamber.

Thus, in the event of a release following full service brake activation, the escape of fluid pressure from the unlocking chamber is more rapid than the escape of fluid pressure from the locking chamber. Accordingly, it is ensured that locking takes place before the operating force of the spring-actuated cylinder device begins to replace that of the service brake cylinder device.

The brake cylinder device embodying the invention and as so defined is found to react differently to a slow rate of pressure reduction as compared to the rate of reduction in the service brake pressure.

An electro-magnet valve device may be operably connected to the unlocking chamber of the locking piston in order to guarantee, by having this chamber communicate with the atmosphere, that the locking device remains in service, whatever the change in service brake pressure may be.

It is advantageous to provide retaining means for keeping the locking device in its locked position when the service pressure rises from the "locking" value to the "displacement" value, above defined, such retaining means being in the form of a projection formed on the locking element for cooperatively engaging with a groove provided on the brake piston rod.

Other objects of the present invention will become apparent when the following description, which is not intended to be limitative of the invention, is read with reference to the accompanying drawings to provide an understanding of how the invention may be put to practical use.

DESCRIPTION AND OPERATION

Figure 1:
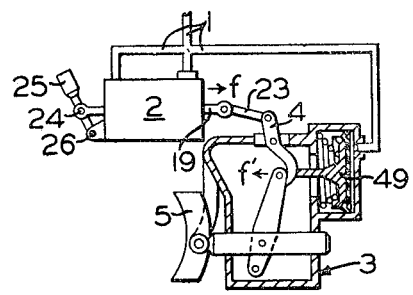
FIG. 1 is a schematic representation of a spring-actuated brake cylinder device embodying the invention and shown connected to a brake unit.

The brake assembly shown in FIG. 1 is operably controlled via a fluid pressure control pipe 1 which may be considered a source of fluid under pressure and is branched so as to feed, on the one hand, a spring-actuated brake cylinder device 2 embodying the invention and, on the other hand, a service brake cylinder device 3. A lever arrangement is operably interconnected between brake cylinder device 2, through a connecting lever 4 installed in the usual manner, and the service brake cylinder device 3 so as to control the parking brake for the vehicle. The devices 2 and 3, when operated in the directions indicated by arrows $f$ and $f'$, respectively, actuate a brake shoe 5 in a non-additive manner, since, when one of the devices, such as 2 for example, produces a brake-applying force, the other, 3, does not. It should be apparent that the brake assembly may be adapted to operate a disk type brake.

Figure 2:
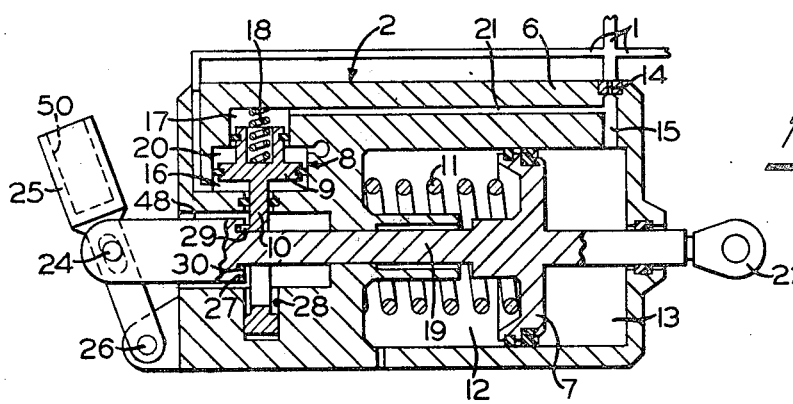
FIG. 2 is an elevational sectional view, on a larger scale, of the spring-actuated brake cylinder device shown in FIG. 1.

The spring-actuated brake cylinder device 2, shown in more detail in FIG. 2, comprises a housing 6, a brake piston 7, and a locking device 8, the latter comprising a locking piston 9 and a locking element 10 or any other similar member (finger, jaw, ring of rollers, clamp collar, etc.) controlled by said locking piston.

The brake piston 7 is acted upon (a) in the direction of brake application, indicated by arrow $f$, by a powerful spring 11 located in a spring chamber 12 which communicates with atmosphere, and (b) in the opposite direction, that is, of brake release by control fluid pressure prevailing in a release chamber 13 formed in housing 6 adjacent the side of brake piston 7 opposite spring 11. The pressure in chamber 13 is supplied thereto and released therefrom via a pipe at a restricted rate as determined by a choke 14 of predetermined flow capacity interposed between pipe 1 and a branch passageway 15 connecting said pipe to said chamber.

The locking piston 8 is a differential piston the larger pressure area of which is disposed adjacent an unlocking chamber 16, and the smaller pressure area of which is disposed adjacent a locking chamber 17. There is located in chamber 17 a locking spring 18 which assists in the locking operation of the locking device 8, and is, in any case, sufficient to ensure blocking of a piston rod 19 of piston 7 when the service brake pressure in chamber 13 is zero. The chambers 16 and 17 are sealingly separated by an atmospheric chamber 20 which communicates with atmosphere.

It should be noted that chamber 16 is unobstructedly connected with pipe 1 whereas chamber 17 is connected with the same pipe by way of choke 14 and a branch passageway 21 connected to passageway 15.

The brake piston rod 19 is provided at its right end with a loop 22 by which it is pivotally connected to a connecting link 23 operably connecting said piston rod to lever 4. The left end of piston rod 19 is pivotally connected by a pin and slot arrangement 24 to an auxiliary release lever 25 pivotally anchored at one end 26 to the housing 6 of the cylinder device 2. At a suitable axial point between connection 24 and piston 7, rod 19 is provided with an annular shoulder 27 adapted to cooperate with locking element 10. Axial displacement of locking element 10 is guided in a bore 28 formed in housing 6.

A projection or toe 29 is formed on locking element 10 so as to be cooperably engageable in an annular axially disposed groove 30 formed cooperatively by rod 19 and shoulder 27. The toe 29 and groove 30 make it possible to positively lock the brake piston 7 in a full release position, in which it is shown in the drawing, during service brake application at a pressure which lies between the values of actuation of the locking device 8 and the brake piston, or also in the pressure-increasing phase during full service brake application, as long as the brake piston has not moved back to free the toe 29 of the locking device.

Figure 3:
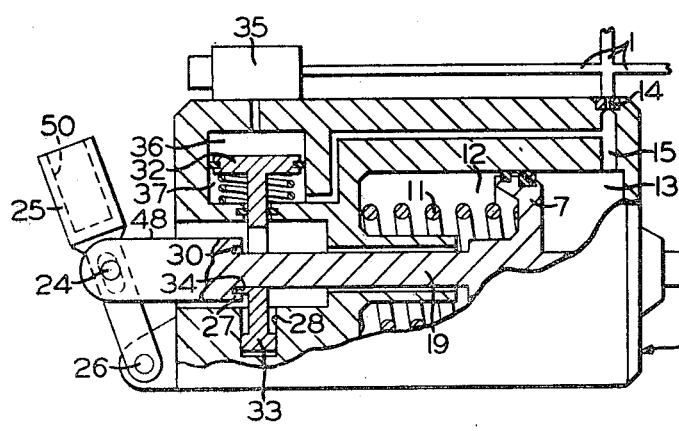
FIG. 3 is an elevational sectional view of a modified embodiment of the spring-actuated brake cylinder device shown in FIG. 2 and on the same scale.

The embodiment shown in FIG. 3 comprises a spring-actuated brake-cylinder device 31 substantially similar to spring-brake cylinder device 2, except for the arrangement of a differential piston 32. Differential piston 32 is not provided with an atmospheric chamber, because (a) a locking element 33 has a toe 34 which is engageable in groove 30 on the side of piston rod 19 opposite to that on which toe 29 of locking element 10 engages said groove, and accordingly in a manner inverse to that of the locking device 8 shown in FIG. 2, and (b) an electro-magnet valve device 35 is interposed between pipe 1 and an inlet passageway connecting to unlocking chamber 36 disposed oppositely to a locking chamber 37. Electro-magnet valve device 35 operates to normally connect chamber 36 with the atmosphere, so as to ensure locking of piston rod 19, and to reconnect said chamber with pipe 1 so as to be able to unlock said piston rod during full service brake activation.

Figure 4:
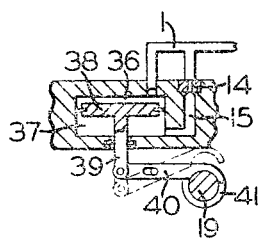
FIGS. 4 and 5 are fragmentary sectional views, on the same scale of further modifications of the spring-actuated brake cylinder device shown in FIG. 2.

In the embodiment shown in FIG. 4, a locking piston 38 is connected via a piston stem 39 to a locking lever 40 capable of pivoting while remaining in a plane perpendicular to the axis of piston rod 19 so as to engage with an annular groove or shoulder 41 formed on the rod.

Figure 5:
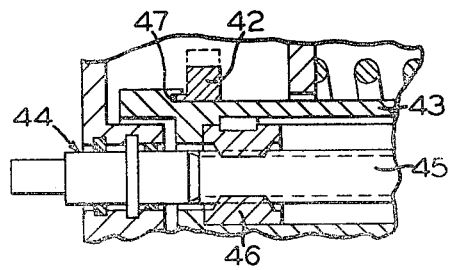

FIG. 5 shows a locking lever 42 similar to locking lever 39 shown in FIG. 4, said locking lever 42 being engageably interlocked on a guide tube or sleeve 43 connected to and axially movable with brake piston 7. A manually operable auxiliary release device 44 for manually operating piston 7 to its release position is formed by a reversible screw 45, which is also capable of being turned by axial movement of sleeve 43. By manually turning externally threaded screw 45 by means of a suitable tool, it is possible to move an internally threaded cooperating nut 46 coaxially disposed within guide sleeve 43 in order to produce a return of brake piston 7, sufficient to release the brake shoe 5 and effect engagement of locking lever 42 with a groove 47 formed on said sleeve.

Operation of the spring-actuated brake cylinder device 2 embodying the invention will now be described with reference to FIG. 2, solely with regard to the various instances of service pressure reduction after full service brake action.

Chambers 13, 16, and 17 are assumed to be charged at maximum control pressure, in which situation brake piston 7 is in its fully release position in which brake shoe 5 is completely out of contact with the vehicle wheel (not shown).

Description of the operation at this point applies only to such pressures of the service brake pressure capable of moving locking piston 9 upwardly, i.e. to an unlocking position. It should be understood that it is unnecessary to consider the situation involving lower pressures since, in the last-mentioned situation, the locking device 8 remains in its locked position.

When the vehicle is stationary for a relatively long period of time, a slow leakage of the brake pressure may occur in the brake system. When the auxiliary reservoir (not shown) is no longer able to compensate for this leakage, the pressure in the chambers 13, 16, and 17 is slowly reduced. At a pressure value $P_1$, brake piston 7 is able to begin to move towards the right out of its full release position in which brake shoe 5 is totally released, while locking device 8 remains unlocked (piston 9 up). Then, at a pressure value $P_2 < P_1$, locking piston 9 moves downwardly under the influence of spring 18 and also as a result of the differential pressure acting across the effective pressure areas adjacent chambers 16 and 17. Since brake piston 7 has begun its displacement to the right, locking element 10 is no longer engaged by shoulder 27, and therefore comes to rest on an unobstructed or larger-diameter portion 48, comprising the left-end portion of rod 19, without blocking axial movement thereof. Thus, spring-actuated cylinder device 2 progressively replaces the function of a service piston 49 contained in service brake cylinder device 3.

Instead of actuation of the brakes for stopping the vehicle, release of the brakes as a result of normal control action following a full service brake application will now be considered. This normal brake release control action involves a rapid drop in service brake control pressure. Chambers 13, 16, and 17 are vented via pipe 1, but owing to choke 14, unlocking chamber 16 is vented more rapidly than chambers 13 and 17. This means that the brake pressure maintained in locking chamber 17, because of restricted flow through choke 14, causes locking piston 9 to move downwardly and locking element 10 to be relocked. This type of operation of locking piston 9 and locking element 10 also occurs subsequently to an emergency type brake application in which service brake pressure is released at a rapid rate also from unlocking chamber 16. The flow rate of choke 14 is predetermined such that the pressure prevailing in release chamber 13 reaches the value $P_1$ only after locking device 8 has returned to its locked condition. In some cases it may be preferred to use two differently calibrated chokes provided in the feeding and vent passageways of chambers 13 and 17.

After operation of spring-actuated cylinder device 2 in stopping the vehicle, the brake system is recharged with fluid pressure, whereupon a full service brake application may be effected and followed by normal releasing of the brakes.

When it is necessary to bring about a brake release on a stationary vehicle without having a fluid pressure source available, a bar or lever (not shown) may be inserted or screwed into an opening 50 formed in the end of release lever 25, whereby said release lever may be rotated about its pivoted end 26 in a counterclockwise direction to cause leftward movement of brake piston 7 and rod 19 until locking element 10, after sliding over portion 48, engages, under the influence of spring 18, with groove 30 which follows shoulder 29.

Finally, when it is desired to change the friction lining on brake shoe 5 to which the spring-actuated brake cylinder device 2 is connected, it is merely necessary to cut off supply of fluid pressure from the particular distributor (not shown) from which said brake cylinder is fed, then to rapidly discharge fluid pressure from the distributor control reservoir so as to simulate a quick release. In this way, the locking device 8, as above explained, is locked under the influence of predominant pressure prevailing in chamber 17 as effected by choke 14. It is also possible, by discharging the auxiliary and control reservoirs, to effect a manual release by means of lever 25, as above explained.

It is quite evident that changes can be made in the spring-actuated brake cylinder devices above described while remaining within the scope of the invention. Thus, the cooperative functions described in connection with control of release chamber 13 and control of chambers 16 and 17 controlling operation of locking piston 9, is also applicable to hydraulic spring-actuated brake cylinders or to brake cylinders for highway vehicles. It is also possible to have the locking device act on the piston itself, instead of on the piston rod. The locking device may, on the other hand, comprise a differential piston system with two pistons located on opposite sides of piston rod 19.

Having now described the invention, what I claim as new and desire to secure by Letters Patent is:

1. A spring-actuated brake cylinder device of the type comprising brake piston means including a brake piston and a piston rod having a larger-diameter portion at one end opposite an end connected to the brake piston and an axially disposed annular groove formed within said larger-diameter portion at the juncture of said larger-diameter portion with a smaller-diameter portion of the piston rod and extending along the radius of said rod a distance less than the radius of said larger-diameter portion, a brake spring acting on one side of said brake piston means for urging movement thereof in one direction toward a brake-applying position, the opposite side of said brake piston means being subjected to service brake fluid pressure prevailing in a release chamber disposed adjacent said opposite side of the brake piston means and acting in opposition to said brake spring for urging the brake piston means toward a release position, and a locking device which comprises a locking element capable of blocking axial movement of the brake piston means, a locking piston to which said locking element is operably connected, said locking element having a projecting toe engageable in said annular groove in a locking relationship therewith, biasing means for urging said locking piston, and therefore said locking element, toward a locked position in which said annular groove is engaged by said projecting toe, said locking piston being subjected and operable responsively to said service brake pressure at a displacement value commensurate with the value at which said brake spring is effective for initiating movement of the brake piston means out of said release position, said displacement value of said service brake pressure being greater than a locking value thereof at which said biasing means is rendered effective for moving said locking piston and element to said locked position.

2. A spring-actuated brake cylinder device, according to claim 1, further characterized by a fluid pressure source for supplying variable fluid pressure to said release chamber, and choke means interposed between said fluid pressure source and said release chamber in order to delay actuation of the brake piston toward its release position in relation to actuation of the locking piston to its locked position, responsively to a relatively rapid reduction of the service brake pressure following a normal brake release from a full service brake application or an emergency brake release.

3. Spring-actuated brake cylinder device, according to claim 2, wherein said locking piston comprises a differential piston having a larger effective pressure area adjacent an unlocking chamber connected unrestrictedly to said service brake pressure and subject thereto for urging the locking element toward an unlocked position out of engagement with the brake piston means, and a smaller effective pressure area adjacent a locking chamber and subject to service brake pressure supplied thereto through said choke means for urging the locking element toward said locked position, said choke means being effective for causing a delay in reduction of fluid pressure acting on said smaller pressure area relative to said larger pressure area during brake release operation.

4. A spring-actuated brake cylinder device, according to claim 3, wherein the choke means via which service brake pressure is supplied to and released from said locking chamber and said release chamber is one and the same choke.

5. A spring-actuated brake cylinder device, according to claim 3, further characterized by an electro-magnet valve device interposed between said source of service brake pressure and said unlocking chamber and being operable in one position for connecting said unlocking chamber to atmosphere and in a different position for connecting the unlocking chamber to said source of service brake pressure.

* * * * *